United States Patent [19]

Hagihara

[11] 4,323,451
[45] Apr. 6, 1982

[54] ARRAY OF FILTER ELEMENTS

[76] Inventor: Tadashi Hagihara, 4-1, 5-chome, Minami Nagasaki, Toshima-ku, Toyko, Japan

[21] Appl. No.: 910,361

[22] Filed: May 30, 1978

[51] Int. Cl.³ .............................................. B01D 33/32
[52] U.S. Cl. .................................... 210/160; 198/681; 210/328; 210/330
[58] Field of Search ...................... 198/681, 713, 714; 210/154–161, 328–380, 400, 401

[56] References Cited

U.S. PATENT DOCUMENTS

| | | | |
|---|---|---|---|
| 1,207,376 | 12/1916 | Davidson | 210/400 X |
| 2,095,504 | 10/1937 | Kesti et al. | 210/160 |
| 3,856,678 | 12/1974 | Hagihara | 210/160 |

FOREIGN PATENT DOCUMENTS 47-7305  1/1972  Japan .................................. 210/160

Primary Examiner—Robert H. Spitzer
Attorney, Agent, or Firm—Malin & Haley

[57] ABSTRACT

An improved array of filter elements for a self-cleaning filter screen apparatus for continuous removal of suspended solids in a fluid. The filter elements are staggeringly interconnected in the form of an endless belt for movement through the fluid. Each filter element includes an arm with a first hub at the front end and a curved rake or hook at the other end. The arm has a front arm portion or shank portion connected to a rear arm portion. A second or intermediate hub is connected between the front arm portion and the rear arm portion. A row of the filter elements are mounted on two shafts. The front hubs from a rearward row of filter elements are positioned between the intermediate hubs of the forward row of filter elements and each hub is spaced from the adjacent hub. The scraper-separator means is sized to fix the distance between adjacent filter elements similarly connected on the same shafts. An additional separator means is also provided at the forward heel area of the second hub to separate the hubs and provide balanced compression force between adjacent filter elements that are similarly connected to the same shafts. One side of each additional separation means and/or the scraper-separator means may be a female member and the other side may be a male member to provide interlocking support of the array of filter elements.

11 Claims, 8 Drawing Figures

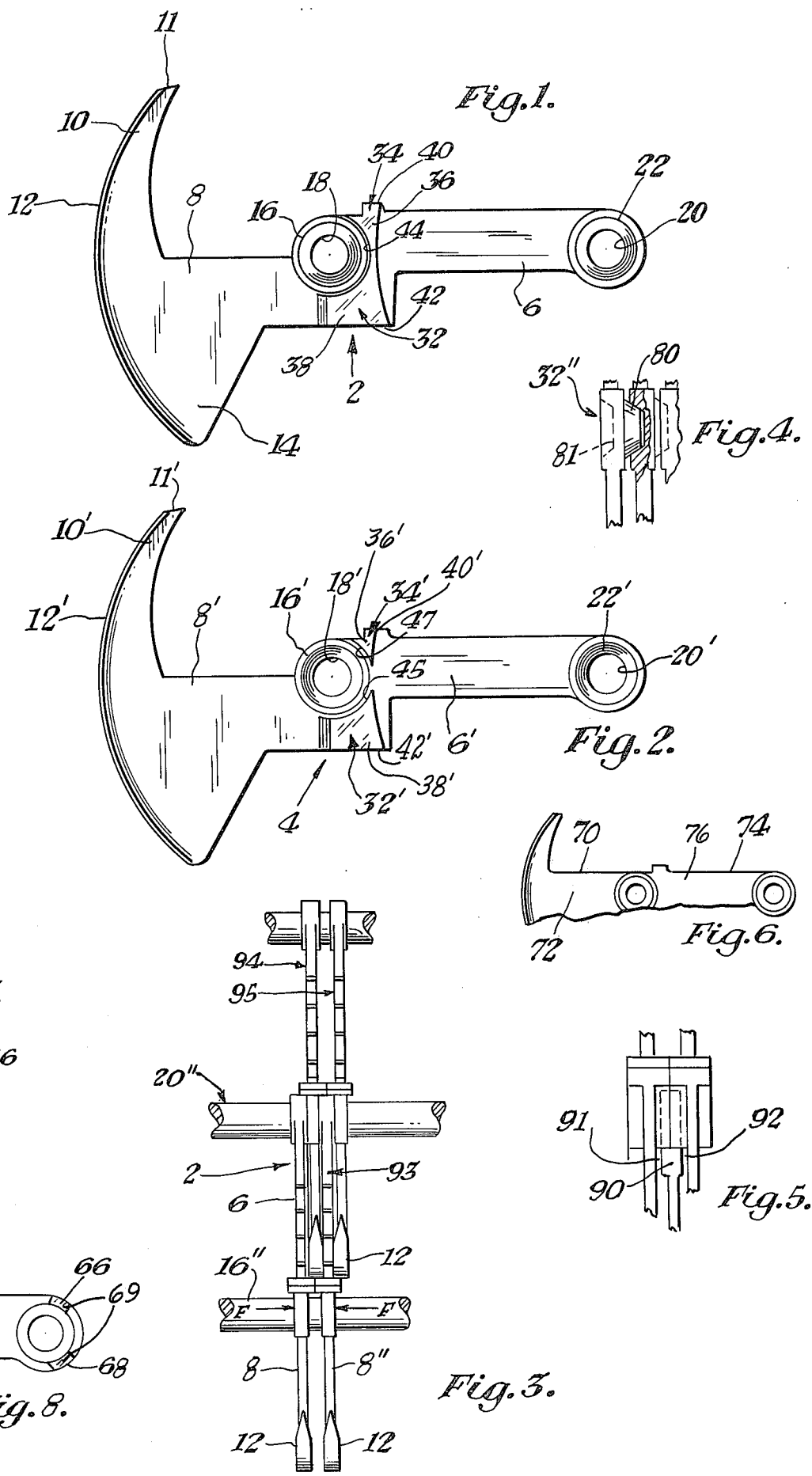

ARRAY OF FILTER ELEMENTS

BACKGROUND OF THE INVENTION

This application relates to an improved array of filter elements in a continuous or intermittent self-cleaning filter screen for removal of suspended solids from a fluid stream.

In the past, each of the generally flat filter element or filter arm were shaped and constructed as disclosed in U.S. Pat. Nos. 3,856,678 and 3,615,022.

Summary of the Improved Array Filter Elements

This invention relates to an improved array of filter elements for a self-cleaning filter screen apparatus. The filter cleaning apparatus is designed to continuously or intermittently remove suspended solids from a fluid. The improved array of filter elements are staggeringly interconnected as shown in U.S. Pat. No. 3,856,678 to form an endless belt or chain that is driven continuously or intermittently through the fluid to remove the suspended solids in the fluid. The endless belt lifts the suspended solids from the fluid and carries them to a position above the surface of the water.

Each improved filter element includes a generally flat longitudinal arm with a front arm portion or shank portion connected to a rear arm portion or hook portion with an intermediate circular hub. A rake extends upwardly and outwardly from the free end of the rear arm portion. Another circular hub or circular front hub is located at the free end of the front arm portion. Each of the circular portions have a bore therein for mounting the filter element on two shafts. The shafts are in turn connected to form the endless belt.

Each improved filter element also includes a separator means adjacent at least one hub. A combination heal separator means and upper separator means may be used. In one embodiment, a combination heal separator means and a scraper-separator means may be adjacent the front of the intermediate or second hub. The separator means is located at the rear of the heel of the intermediate hub to provide an enlarged separator contact area. The separator means fixes the distance between filter elements similarly connected on the same shafts and allow the adjacent hubs to be separated from one another. The separator contact area on adjacent separator means are in face to face contact with one another. The separator means do not move relative to one another. The separator means reduces wear on the relatively movable adjacent filter element hubs, that is, the adjacent hubs positioned side by side in the array of filter elements.

The scraper-separator means adjacent the intermediate hub also includes separator areas on its distal outer ends. The scraper-separator means of adjacent filter elements with their intermediate hub on the same shafts are in contact with one another in a fixed relationship. The scraper-separator means are positioned above the heel separator means to provide a balanced separating structure in relationship to the clamping force holding the rows of filter elements together.

The scraper-separator means also clean adjacent curved rake structures as they move inwardly. The heel scraper means may be designed as a scraper to clean adjacent curved rake structures as they move outwardly.

The raised scraper-separator means adjacent the intermediate hub may be connected to the separator means to provide a nonjammable design and to provide cover protection for the intermediate hub area.

The separator means may have a right and left portion positioned on opposite sides of each filter element. The right and left portions may be designed with a mating male and female connector to provide interlocking support of the array of filter elements.

The separator means may be located adjacent the front hubs. The separator contact area on adjacent separator means are in face-to-face contact with one another and may provide spacing between adjacent hubs.

A bar-type separator means may be used. The bar is placed across the intermediate hubs connected to the same shafts in the same manner. A separate pin or other connector is connected between each intermediate hub and the bar to maintain a fixed spacing between hubs. The bar may include shims projecting downwardly between the filter elements of a single row of filter elements similarly connected to two shafts.

The rear arm portion may include a wide flaring portion to maintain the rear arm portions between adjacent front arm portions of a rearward row of filter elements. Further, the upper edge of the rear arm portion may be on the same line as the upper edge of the forward arm portion of the same filter element. This provides a rest position with the upper edge of the rear arm portion lying in the same plane as the adjacent forward arm portions of a rearward row of filter elements.

It is an object of this invention to provide a separator means that fixes the spacing between each filter element in the array in order to maintain the filter spacing and reduce hub wear.

Another object of this invention is to provide separator means that are fixed relative to one another and are in contact with one another.

Another object of this invention is to provide separator means that are of a nonjammable design.

Another object of this invention is to provide a scraper means having a separating function in relation to adjacent filter elements having their intermediate hub on the same shaft.

It is another object of this invention to provide a fixed separation between adjacent filter elements having their intermediate hubs on the same shaft by utilizing a combination of an upper scraper means separator and a heel separator means positioned forward of the intermediate hub.

It is another object of this invention to provide circular hubs with a raised separator means forward of the circular intermediate hubs having a concaved circular rearward edge to provide a cover or shielding for the hub area.

Another object of this invention is to provide a combination circular hub and first separator means that closes off the area between adjacent filter elements having their intermediate hubs on the same shaft except for the rear portion designed to accommodate movement of the forward arm portion of filter elements completely positioned rearward of first separator means.

It is another object of this invention to provide separators adjacent the intermediate hub having a balanced separator surface area in order to avoid an unwanted torque or bending forces due to the filter element clamping force.

Another object of this invention is to provide interlocking male and female separator means and/or scraper-separator means.

Another object is to provide separator means adjacent the forward hub.

Another object of this invention is to provide external bar-type hub separators.

Another object of this invention is to provide an upper edge of the rear arm portion in the same line as the upper edge of the forward arm portion of a filter element.

Another object is to provide a rear arm portion sized to always remain between the adjacent arm portions of another row of filtering elements.

An additional object is to provide a heal scraper on the intermediate hub portion.

In accordance with these and other objects which will be apparent hereinafter, the instant invention will now be described with particular reference to the accompanying drawings.

BRIEF DESCRIPTION OF THE DRAWINGS

In the drawing:

FIG. 1 is a side view of a new and improved filter element,

FIG. 2 is a side view of another embodiment of a new and improved filter element, FIG. 3 is a top view of a plurality of rows of filter elements or an array of filter elements, FIG. 4 is an enlarged top view of mating separator portions, FIG. 5 is an enlarged top view of the separator and scraper-separator portions adjacent the intermediate hub with an adjacent forward hub illustrated in place, FIG. 6 is a side view of yet another embodiment of a filter element, FIG. 7 is a top view of a portion of an array of filter elements with forward hub separator means, and FIG. 8 is a side view illustrating forward hub separators.

DETAILED DESCRIPTION OF THE INVENTION

Referring now to FIGS. 1, 2, and 3, the improved filter element 2 is used for a self-cleaning filter screen apparatus as disclosed in U.S. Pat. Nos. 3,856,678 and 3,615,022, the disclosure of which is incorporated herein by reference. The filter screen apparatus is used to continuously or intermittently remove suspended solids in a fluid. The improved filter elements are staggeringly interconnected to form an endless belt that is driven continuously or intermittently to remove the suspended solids.

Each filter element as shown in FIG. 1 includes a generally flat rear arm portion 8 connected to said front arm portion 6 or forward arm portions 6. The rear arm portion extends outwardly longitudinally from the front arm portion, with a curved rake 10 extending upwardly and outwardly from the free end of the rear arm portion 8. The rake or hook 10 has a flange 12 projecting outwardly from both sides of the rake. The top of the hook has a point 11. The rear portion also includes a lower enlarged plate portion 14. The plate 14 is sized to always keep the plate between adjacent front arms of a rearward row of filter elements. An intermediate generally circular hub portion 16 is located between the front arm portion 6 and the rear arm portion 8. A forward or front circular hub 22 is connected to the free end of the front arm portion. The hubs may project outwardly from both sides of the filter element or lie in the plane of the arms. Each of the hub portions 22 and 16 have a bore 20 and 18 respectively therein for mounting a row of filter elements on two shafts such as those shown in FIG. 3. Filter elements 2 with arms 6 and 8 are connected on shafts 16" and 22" with other filter elements such as 93. Filter elements 2 and 93 make up a row of filter elements. The shafts 16" and 22" are connected to the endless belt to provide a complete filter screen apparatus.

Referring now to FIGS. 1, 7, and 8, spacer means may be used to separate each filter element in each row of filter elements positioned in a similar manner on the same two shafts, such as filter elements 2 and 93 illustrated in FIG. 3. Filter elements 2 and 93 are on shafts 16" and 20". The forward row of filter elements are shown by numerals 94 and 95. A rearward row may have one hub attached to shaft 16".

In FIG. 1, the separator means is shown by numeral 32 with contact surface area 38 positioned adjacent the heel of the intermediate hub 16. The heel separator means may include a reverse scraper means at 42. The scraper 34 adjacent the upper portion of the intermediate hub 16 includes a separator portion. The scraper-separator has a contact surface area 36 and a scraper 40. The two separator means areas are joined together to form a hub cover or hub protective means. The concave-shaped wall 44 shields the hub 16 and the shaft 16" and the forward hub of the rearward row of filter elements.

In FIG. 1, the filter element 2 includes a hub portion 16 and 22 that are held out of contact in relationship to the next adjacent hub 90 as shown in FIG. 5. The spacing between hubs is shown by numerals 91 and 92. Each hub, such as hub 90, moves relative to the adjacent hubs as the filter elements move around the endless belt.

The filter element as shown in FIG. 2, includes a generally flat rear arm portion 8' connected to said front arm portion 6' or forward arm portions 6'. The rear arm portion extends outwardly longitudinally from the front arm portion, with a curved rake 10' extending upwardly and outwardly from the free end of the rear arm portion 8'. The rake or hook 10' has a flange 12' projecting outwardly from both sides of the rake. The top of the hook has a point 11'. An intermediate generally circular hub portion 16' is located between the front arm portion 6' and the rear arm portion 8'. A forward or front circular hub 22' is connected to the free end of the front arm portion. The hubs may project outwardly from both sides of the filter element or lie in the plane of the arms. each of the hub portions 22' and 16' have a bore 20' and 18' respectively therein for mounting a row of filters on two shafts such as those shown in FIG. 3.

In FIG. 2, the separator means is shown by numeral 32' with contact surface area 38' positioned adjacent the heel of the intermediate hub 16'. The heel separator means may include a reverse scraper means at 42'. The scraper 34' adjacent the upper portion of the intermediate hub 16' includes a separator portion. The scraper-separator has a contact surface area 36' and a scraper 40'. The two separator means areas are not joined together. The two concave-shaped walls 45 and 47 shield the hub 16' and shaft 16" and the forward hub of the rearward row of filter elements. In FIG. 2, the filter element also includes a hub portion 16' and 22' that are held out of contact in relationship to the next adjacent hub as shown in FIG. 5.

FIG. 4 shows mating separator portions 32". Female interlock portion is shown as 81 and male interlock portion is shown as 80.

The separator means 66, 66', and 68, 68' (not shown) may be located adjacent the front hubs as shown in FIGS. 7 and 8. It should be noted that a single longer separator means on one side of each filter element may replace the two separator means. The separator contact area 69 on adjacent separator means are in face-to-face contact with one another and may be used to provide spacing between adjacent hubs as shown in FIG. 7.

A bar-type separator means (not shown) may be used. The bar is placed across the intermediate hubs connected to the same shafts in the same manner. A separate pin or other connector is connected between each intermediate hub and the bar to maintain a fixed spacing between hubs.

The rear arm portion, as shown in FIG. 6, may have the upper edge 70 of the rear arm portion 72 on the same line as the upper edge 74 of the forward arm portion 76 of the same filter element. This places the upper edge of the rear arm portion in the same plane as the adjacent forward arm portions of a rearward row of filter elements when the filter element array is in a rest position. This provides single stage filtering.

The upper edge of the rear arm may be designed to be positioned anywhere between the position shown in FIG. 1 and FIG. 6 for two-stage filtering. The lower edge of the forward arm portion may be lowered to accomplish the same function of raising the upper edge of the rear arm. It should be noted that in a two stage filtering device with the least fluid head drop, the upper edge of the rear arm is in the position shown in FIG. 1, the lower edge of the forward arm will also be on the same line (not shown) as the upper edge of the rear arm.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A filter element for use in a filtering system that includes an array of moving filter elements connected to a plurality of filter element holding devices driven by a power source, the filtering system includes an array of filter elements with every other row of filter elements having each filter element partially positioned between each adjacent filter element in each adjacent row of filter elements, said filter element comprising:
   an arm including a forward portion, rear portion, and a first connecting means and second connecting means,
   said first connecting means and said second connecting means for connection of said arm to holding devices, and
   separator means positioned along said arm, said separator means for fixing the spacing between adjacent filter elements similarly positioned on the same holding devices, said separator means shaped to bridge the filter elements in adjacent rows.

2. A filter element for use in a filtering system that includes an array of moving filter elements connected to a plurality of filter element holding devices driven by a power source, as set forth in claim 1, wherein:
   said first connecting means is an intermediate hub positioned between said forward portion and said rear portion,
   said second connecting means is a forward hub near the distal end of said forward portion,
   a hook connected on the distal end of said rear portion, and
   said separator means sized and positioned on said arm for providing non-moving contact between the adjacent filter element similarly positioned on the same holding devices.

3. A filter element as set forth in claim 2, wherein:
   said separator means connected to said arm adjacent said forward hub.

4. A filter element as set forth in claim 2, wherein:
   said separator means connected to said arm adjacent the forward side of the said intermediate hub.

5. A filter element as set forth in claim 4, wherein:
   said separator means includes an upper scraper means for scraping an adjacent hook in the array of moving filter elements and a heel scraper means for scraping an adjacent hook in the array of moving filter elements.

6. A filter element as set forth in claim 5, wherein:
   said forward hub and said intermediate hub having a circular shape.

7. A filter element as set forth in claim 6, wherein:
   said separator means including male-female interlocking mating surfaces to aid in interlocking a row of filter elements together.

8. A filter element as set forth in claim 4, wherein:
   said separator means having a single enlarged separator projecting outward to each side of said filter element to provide distal separator contact surfaces,
   said intermediate hub having a circular shape,
   said separator means having a rearward concaved surface to cover at least a portion of said intermediate hub.

9. A filter element as set forth in claim 2, wherein:
   said forward portion including an upper edge,
   said rear portion includes an upper edge positioned no higher than said upper edge of said forward portion, and
   said rear portion having an enlarged lower surface to keep a portion of said rear portion between adjacent forward portions of the arms of another row of filter elements.

10. In an array of staggeringly interconnected thin filter elements in a plurality of rows held together by a transverse clamping force on a plurality of parallel spaced apart support shafts, the first row of filter elements that are supported on a first forward shaft and a second rearward shaft with an adjacent forward row and rearward row of like filter elements also supported by two adjacent shafts, the rearward shaft of the adjacent forward row is the same shaft as said first forward shaft, the forward shaft of the adjacent rearward row is the same shaft as said second rearward shaft, filter elements comprising:
   filter elements,
   each of said filter elements including an arm with two hubs located in said arm, each hub includes a bore for connecting each of said filter elements to support shafts,
   separator means for separating adjacent filter elements that are similarly held on the same two shafts, said separator means positioned adjacent and about at least a portion of one of said hubs, said separator means including projecting means for projecting outward from at least one side of each of said filter elements for distal contact with at least one of the adjacent filter elements that are similarly held on the same two shafts, said separator means having at least one surface area balancing means for balancing the transverse clamping force holding a plurality of filter elements in each row that are similarly held on the same two shafts.

11. In an array as set forth in claim 10, wherein:

said arm including a forward portion and a rearward portion, one of said hubs is positioned intermediate said forward portion and said rearward portion, said separator means connected adjacent the forward side of said intermediate hub, said separator means of each filter element is in contact with separator means of adjacent filter elements similarly connected on the same shafts to provide a separation of each hub side surface from the relatively moving adjacent hub side surfaces.

* * * * *